Figure 1:
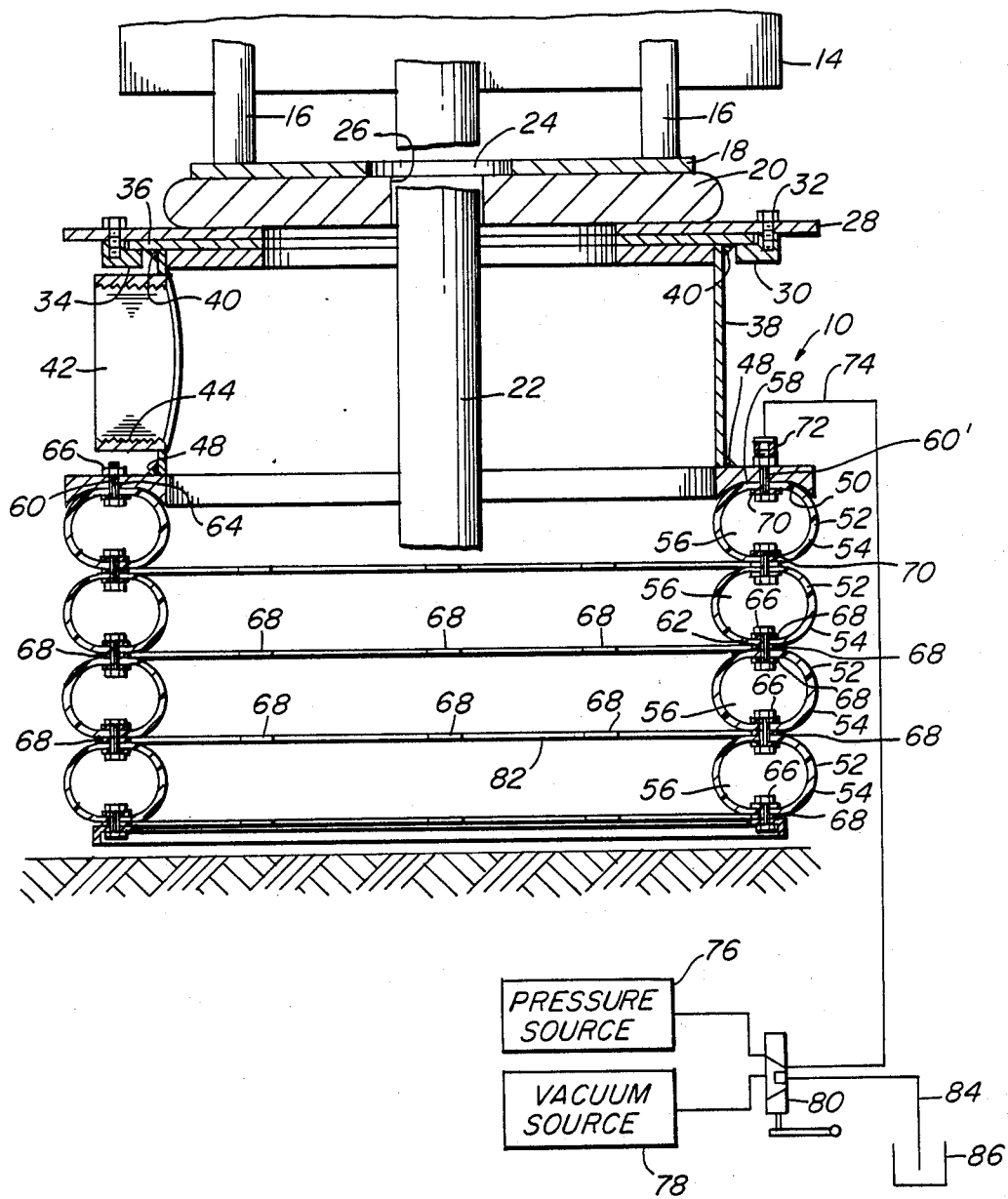

United States Patent [19]

Johnston

[11] Patent Number: 4,889,196

[45] Date of Patent: Dec. 26, 1989

[54] DIVERTER APPARATUS

[76] Inventor: Vaughn R. Johnston, 40 Kelley Rd., Washington, Pa. 15301

[21] Appl. No.: 268,486

[22] Filed: Nov. 7, 1988

[51] Int. Cl.[4] .................... E21B 21/06; E21B 33/02
[52] U.S. Cl. .................... 175/209; 175/213; 175/214
[58] Field of Search ............... 175/88, 161, 206, 207, 175/209, 212, 213, 214; 277/34, 34.3, 34.6

[56] References Cited

U.S. PATENT DOCUMENTS

| | | | |
|---|---|---|---|
| 2,122,517 | 7/1938 | Curtis | 175/206 |
| 3,033,298 | 5/1962 | Johnson | 175/209 |
| 3,417,830 | 12/1968 | Nichols | 175/209 |
| 3,499,641 | 3/1970 | Peterson | 269/22 |
| 3,698,724 | 10/1972 | Blachere et al. | 277/34.3 |
| 3,924,696 | 12/1975 | Horlin et al. | 175/209 |
| 4,321,975 | 3/1982 | Dyer | 175/206 |
| 4,440,243 | 4/1984 | Howeth | 175/209 |
| 4,444,280 | 4/1984 | Howeth | 175/206 |

FOREIGN PATENT DOCUMENTS

| | | | |
|---|---|---|---|
| 2523682 | 9/1983 | France | 277/34 |
| 220480 | 5/1968 | Sweden | 175/213 |
| 407855 | 11/1962 | Switzerland | 80 D/11 |
| 457322 | 7/1968 | Switzerland | 175/209 |
| 466324 | 6/1975 | U.S.S.R. | 175/ |

Primary Examiner—Jerome W. Massie IV
Assistant Examiner—Terry Lee Melius
Attorney, Agent, or Firm—Carothers & Carothers

[57] ABSTRACT

A diverter apparatus for use in conjunction with earth drilling operations to divert cuttings from the area surrounding the bore hole, and including a pneumatically extensible and retractable ground-engaging skirt which surrounds the bore hole.

17 Claims, 1 Drawing Sheet

U.S. Patent    Dec. 26, 1989    4,889,196

DIVERTER APPARATUS

BACKGROUND OF THE INVENTION

Earth drilling operations typically include provision for a blast of pressurized air to be directed downwardly through an axial through bore in an elongated drill string and thence upwardly through the annular space between the drill string and the walls of the bore hole to remove cuttings or chips from the bore hole as drilling progresses. The force of the pressurized air stream ejects the cuttings from the bore hole with sufficient force and velocity that the cuttings can be a danger to workers in the immediate area. In addition, the accumulation of ejected cuttings around the bore hole entry presents a significant cleanup problem, a safety hazard, and an inconvenience to drilling operations. These conditions are no less of a problem for drilling operations which utilize a liquid flushing medium such as water or drilling mud rather than a pressurized air stream to clear cuttings from the bore hole.

In the earth drilling arts it is well known to provide a diverter apparatus in the form of a generally cylindrical elongated sleeve or skirt structure positioned generally coaxially with respect to the drilling axis and thus encompassing the bore hole entry. A diverter apparatus typically engages the ground in surrounding relationship with the bore hole entry to thereby protect workers in the immediate area from the flying cuttings or chips ejected from the bore hole, and to divert such cuttings away from the bore hole entry via a diverter coupling to a remote location for ultimate disposal of the cuttings.

There are known in the art a variety of sludge removal bonnets, dust collecting devices, and otherwise characterized diverter assemblies for rock drills and other drilling apparatus. Such known diverters commonly have been carried by a mobile or portable drilling apparatus for selective movement thereof into engagement with an area surrounding the location of the bore hole to provide the desired diverter capability during drilling operations. For example, Swiss Pat. No. 407,855 appears to disclose a corrugated skirt of sorts which is positioned about a bore hole entry to provide a space about the bore hole from which cuttings may be directed by way of a diverter connection. U.S. Pat. No. 3,499,641 discloses a fluid pressure actuated, diaphragm type clamping device which, under the impetus of fluid pressure, is moved into clamping engagement with a workpiece for drilling thereof. Other patents relating generally to diverter apparatus include U.S. Pat. Nos. 3,033,298, 3,924,696, 4,321,975, 4,444,280, 3,417,830, and 4,440,243, as well as Russian Pat. No. 466,342.

The prior art as above characterized includes diverter structures which are carried by a drilling apparatus and are movable by suitable motive means selectively into or out of engagement with a surface area encompassing the bore hole entry so that the diverter may be quickly and efficiently placed for drilling operations, and just as easily withdrawn when it is desired to move the drilling rig from one drilling site to another. This is especially important for mobile drills as it is not economical or convenient in mobile drill operations to set and cement a conductor pipe for each bore hole drilled in order to accommodate cuttings removal from the bore hole. It is, however, just as necessary for portable or mobile drilling rigs as for others to have available the above characterized cuttings diverting capability in order to ensure efficient and safe drilling operations.

Practitioners of the art thus have continually sought improved apparatus for providing diverter capability, especially for portable drills in drilling operations which require convenient mobility for movement of the drill frequently from one drilling site to another.

BRIEF SUMMARY OF THE INVENTION

The present invention contemplates a novel and improved diverter apparatus which is operable under the impetus of fluid pressure and vacuum or reduced pressure application within pressure chambers which are formed to define a selectively extensible and retractable skirt that constitutes a perimeteral wall system for an extensible and retractable diverter. The term "fluid" is used herein to refer to both hydraulic and pneumatic fluid, although the invention is described primarily in terms of air pressure operation. Additionally, the term "fluid pressure" is used herein to signify both elevated and reduced pressure (i.e. both pressures greater than and less than ambient pressure).

The invention is constituted of a plurality of generally annular sealed pressure chambers disposed in coaxially adjacent relationship with one another and secured fixedly together by securing elements, at least some of which preferably also include fluid flow passages for fluid communication between respective adjacent ones of the annular air chambers, whereby motive fluid pressure, either elevated or reduced, may be applied in the stack of sealed chambers as needed extend or retract the diverter skirt.

Each individual chamber is formed from a substantially continuous circular tube of resiliently deformable material such as rubber. The tendency of air pressure applied within the chambers tend to exert an extending force which extends the stack of tubular elements into engagement with the ground surface surrounding a bore hole site. Application of a partial vacuum within the air chambers results in external air pressure reducing the volume of each chamber whereby the retractable skirt is drawn upwardly and out of engagement with the ground surface so that the drilling rig may be readily moved to another drilling site and the diverter assembly repositioned quickly and efficiently in engagement with the ground surface. The invention thus affords improved ease and convenience of diverter operation.

It is accordingly one object of this invention to provide a novel and improved diverter apparatus.

A more specific object of the invention is to provide a fluid powered, selectively extensible and retractable diverter apparatus.

A further object of the invention is to provide a diverter apparatus including a resiliently flexible skirt element to encompass a drilling site, and which skirt element is selectively extensible and retractable under the impetus of fluid pressure applied within sealed chambers which form the skirt element.

Figure 2:
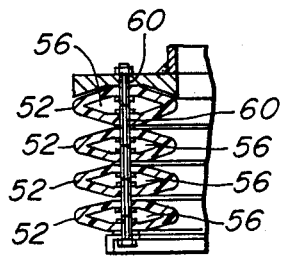

These and other objects and further advantages of the invention will be more fully appreciated upon consideration of the following detailed description and the accompanying drawings, in which:

FIG. 1 is a sectioned side elevation of a diverter apparatus according to one presently preferred embodiment of the instant invention and showing an extensible diverter skirt in a partially extended configuration; and FIG. 2 is a fragmentary portion of FIG. 1 showing the selectively extensible skirt in a retracted configuration.

There is generally indicated at 10 in FIG. 1 a diverter assembly according to one presently preferred embodiment of the instant invention which is affixed to a drilling rig such as a truck carried mobile drilling rig 12.

As is well known, the drilling rig 12 comprises a suitable base or platform 14 which carries the drilling apparatus including an upstanding derrick 16 having such customary elements as a pinch plate 18 and a wiper rubber 20 adjacent its lower end. A drill string 22 extends vertically through an opening 24 formed by the jaws of pinch plate 18 as well as through a central opening 26 in wiper rubber 20, and thence to the ground and into the bore hole being drilled (not shown). Drilling apparatus 12 may also include a diverter mounting plate 28 which carries diverter 10 by means of an annular clamp ring 30 secured to the underside of plate 28 as by bolts 32, and including an annular flange portion 34 which overlaps a cooperating mounting flange portion 36 of diverter 10.

A generally cylindrical upper body 38 of diverter 10 is rigidly affixed as by welds 40 to the underside of mounting plate 36 and includes a diverter discharge connection 42 which extends generally radially outward therefrom. Connector 42 is internally threaded as at 44 to receive any suitable standard pipe coupling and connected pipe (not shown) whereby cuttings or other matter exiting diverter 10 via connector 42 may be passed by way of the connected piping to a selected disposal site remote from the drilling site. By loosening bolts 32 body portion 38 may be rotated 360° to position discharge 42 in any desired rotary position, after which bolts 32 may be retightened to lock body 38 in the desired position.

A generally annular diverter skirt mounting ring 46 is affixed coaxially adjacent the lowermost end of upper body 38 by means of welds 48 for example, and includes a downwardly facing annular undercut or groove 50 which receives therein the uppermost one of plurality of serially disposed and coaxially adjacent, resiliently deformable air chamber elements 52.

Each air chamber element 52 is comprised of a substantially continuously extending, generally circular tubular member 54 of resiliently deformable material such as rubber or the like, and each defining a sealed interior space or chamber 56 of generally annular form.

The uppermost one of elements 52 is nested with the upper exterior surface 58 thereof within groove 50, and is secured in such configuration as by a plurality of circumferentially distributed studs 60 which extend vertically through respective pairs of coaxially aligned bores 62 and 64 formed in the uppermost element 52 and in mounting ring 46, respectively. Threaded nuts 66 engage the opposed ends of studs 60 to fixedly clamp the uppermost element 52 within groove 50, and in addition resiliently deformable seals 68 are provided as needed to seal the chamber 56 within the uppermost element 52 from the ambient environment.

At least one of studs 60, as shown at 60' for example, includes an axial through bore 70 and a pressure conduit coupling 72 affixed to its uppermost end to provide a connection between chamber 56 and a fluid pressure conduit 74 which thus provides motive fluid, preferably elevated air pressure or a partial vacuum, from suitable pressure and vacuum sources 76 and 78. A suitable selectively operable valve 80 is provided to selectively connect conduit 74 to either the pressure source 76 or the vacuum source 78 for the selective application of elevated pressure or vacuum within chamber 56.

In order to accommodate the application of such pressure or vacuum within the chambers 56 of all the elements 52, the adjacent pairs of elements 52 are secured together in a fashion similar to that by which the uppermost element 52 is secured to mounting ring 46. That is, for each of the adjacent pairs of elements 52, a plurality of circumferentially distributed studs 60 pass through suitable pairs of axially aligned bores or apertures 62 in the adjacent elements 52 and have nuts 66 engaged on the opposed ends thereof to clamp the adjacent elements 52 together with suitable intervening sealing rings or washers 68 to seal the interior chambers 56 from the ambient environment. As shown, at least some of the studs 60 include an axially extending opening such as an axial through bore 70 to transmit fluid pressure or vacuum between the connected adjacent chambers 56. Of course, only one such bore 70 is needed to communicate between each pair of adjacent chambers 56.

There is thus provided by the invention an elongated generally cylindrical diverter skirt made up of a plurality of coaxially stacked circular elements each defining a generally annular, sealed interior space or chamber which is maintained in open fluid flow communication with the similar interior spaces of all others of the stacked diverter skirt elements to form a single sealed space in which motive fluid in the form of air pressure or vacuum, for example, may be applied to extend or retract the skirt.

The lowermost one of elements 52 carries adjacent a lower extent thereof a generally annular ground engaging flange ring 82 as by means of a plurality of circumferentially distributed studs entirely similar to the studs 60 above described with mounting including nuts 66 and seals 68 as above described, but excluding the through bore 70 in the studs. On rough or uneven terrain, ring 82 may be eliminated thus allowing the lowermost one of elements 52 to conform to the terrain surrounding the bore hole entry to seal the interface between the diverter and the ground.

From the above description, the operation of my novel diverter apparatus will be readily appreciated. Upon positioning of a drilling rig which includes diverter 10 on a drilling site, elevated fluid pressure such as air is provided from source 76 via conduit 74 and coupling 72 to stud 60' where the pressurized fluid medium passes through bore 70 and into chamber 56 within the uppermost one of elements 52. Through the access provided by at least some and preferably all of the connecting studs 60 which secure the respective adjacent elements 52 together, the pressure medium is transmitted throughout the diverter skirt into all of the chambers 56. The pressure applied therein tends to distend the peripheral walls of the elements 52 and thereby extend the skirt downwardly until ring 82 engages the ground surface. With proper proportioning and geometry for the chambers 56, as little as ten pounds of pressure above ambient atmospheric can be effective to maintain ring 82 in contact with the ground surface with a force of engagement as great as 1000 lbs.

The application of pressure at variance with ambient atmospheric pressure within chambers 56 applies generally radially outward force on the peripheral side walls of the chambers 56 as seen in cross section in FIG. 1. The downward extension of the extensible skirt may be facilitated by constructing elements 52 with a geometry of a slightly flattened circular configuration as shown in FIG. 1 whereby the application of pressure within the spaces 56 will tend to maximize the interior volume of spaces 56 by forming the flattened circular configuration thereof into a more uniformly circular configuration. As this occurs, the axial dimension of each element 52 increases. Another means of providing for extension of the skirt from a neutral or non-extended configuration might be suspension springs or the like which bears a portion of the weight of the elements 52 so that the application of pressure within spaces 56 extends the diverter skirt by extending the suspension springs. A further contemplated means of maintaining a neutral geometry from which the elements 52 could be axially extended when chambers 56 are pressurized is the inclusion of suitable reinforcement in the peripheral walls of elements 52.

To retreat the extensible skirt, the valve 80 may be moved to a vent position to connect conduit 74 with a vent conduit 84 whereby the fluid pressure within spaces 56 may be vented to the ambient atmosphere, or if working with a fluid medium which must be contained, to a reservoir 56. Upon release of the pressure within chambers 56, the skirt will spontaneously retract to its natural or undeformed state, influenced only by the hanging weight of the elements 52 and the retention impetus afforded by any such retention elements as the above described springs or internal reinforcements. For further retraction of the skirt, valve 80 may be manipulated to connect conduit 74 with vacuum source 78 whereby a vacuum is applied within chambers 56. As the pressure within the spaces 56 is thus reduced, external air pressure will tend to collapse the elements 52 upwardly in a manner to reduce the volume of chambers 56 as shown in FIG. 2, thereby retracting the skirt upward to a maximum extent defined by axial abutment of interior structural elements within chambers 56 such as aligned ones of studs 60. With the skirt retracted, the drilling apparatus 12 may be readily moved to another site and further drilling commenced upon resetting of the diverter skirt as above described. Of course, the cross sectional geometry and structure of elements 52 is selected by design to facilitate such axial extension and retraction.

According to the above description, I have invented a novel and improved drilling rig diverter apparatus. Of course, I have contemplated various alternative and modified embodiments apart from that described. For example, the specific geometric form of elements 52 and chambers 56 may be varied widely, the interconnecting passageways therefor may take any of a variety of forms other than axial through bores within the connecting studs described, the axial support system for the extensible skirt may include a variety of support elements including or other than suspension springs or may be limited to the resiliency of the elements 52 themselves, and the like. Of course, these and other alternative and modified embodiments would also readily occur to others versed in the art once apprised of my invention. It is therefore intended that the invention be construed broadly and limited only by the scope of the claims appended hereto.

I claim:

1. In an earth drilling apparatus adapted for drilling a bore hole in an earthen formation by driving an elongated drill string into such an earthen formation, a selectively extensible and retractable diverter apparatus for diverting from the drilling site the cuttings which are ejected from the bore hole during drilling, said diverter apparatus comprising:
    a base means having a perimeteral side wall portion with an axial extent that is adapted to extend axially of such a drill string in encompassing relation therewith;
    a skirt mounting means affixed adjacent one axial end of said perimeteral wall portion;
    a selectively extensible, axially elongated skirt means affixed with respect to said skirt mounting means and extending axially away from said means;
    said skirt means comprising a plurality of flexible skirt elements each having defined therein a generally annular fluid chamber;
    said skirt elements being serially disposed in coaxially adjacent relation and adapted to encompass such a drill string;
    a plurality of connector means connecting together each serially adjacent pair of said skirt elements to maintain said serial coaxially adjacent relation thereof;
    at least one of the said connector means connecting together each said serially adjacent pair of skirt elements including passage means providing fluid communication between the respective said fluid chamber;
    motive fluid connection means associated with at least one of said skirt elements and adapted to connect a source of motive fluid flow to the respective one of said fluid chambers; and
    at least one of said skirt elements being of a cross sectional form that results in axial extension thereof upon application of elevated pressure above ambient atmospheric pressure within the respective said fluid chambers and axial retraction thereof upon application of reduced pressure less than ambient atmospheric pressure within the respective fluid chambers.

2. The diverter apparatus as set forth in claim 1 additionally including rigid ground engaging means carried by one of said skirt elements.

3. The diverter apparatus as set forth in claim 2 wherein said mounting means includes a mounting flange means and a plurality of fastener means securing said skirt means with respect to said mounting flange means.

4. The diverter apparatus as set forth in claim 3 wherein said motive fluid connection means includes a fluid flow passage formed in at least one of said fastener means.

5. In a diverter apparatus adapted to encompass a given area about a bore hole entry formed by earth drilling operations, a selectively extensible and retractable diverter skirt comprising:
    a plurality of flexible, generally annular skirt elements each having defined therein a sealed chamber means;
    said skirt elements being serially disposed in coaxially adjacent relation and adapted to encompass such a given area;
    plural connector means connecting together each serially adjacent pair of said skirt elements;
    at least one of the said connector means connecting together each said serially adjacent pair of skirt elements including fluid passage means providing fluid communication between the respective said fluid chamber means;

motive fluid connection means associated with at least one of said skirt elements and adapted to connect a source of motive fluid flow to the respective one of said fluid chambers; and at least some of said skirt elements having a generally tubular cross section of a geometry that said at least some of said skirt elements are extensible in the axial direction upon application of elevated pressure greater than ambient atmospheric pressure within the respective said chamber means and further are retractable in the axial direction upon application of reduced pressure less than ambient atmospheric pressure within the respective said chamber means.

6. The diverter skirt as set forth in claim 5 wherein said at least one of said connector means includes respective threaded stud and nut assemblies clamping together said pairs of serially adjacent skirt elements.

7. The diverter skirt as set forth in claim 6 wherein said at least one of said connector means additionally includes sealing washer means cooperable with said studs and said skirt elements to seal the respective said chamber means from the ambient environment.

8. A diverter apparatus for use in conjunction with earth drilling operations comprising:
   a generally annular, axially extending base assembly adapted to encompass a drilling string;
   said base assembly including a diverter connection adapted for connection to a diverter pipe and communicating with the space encompassed by said base assembly to facilitate removal of drill cuttings via such a diverter pipe;
   said base assembly further including a generally annular diverter skirt mounting member disposed coaxially therewith adjacent one axial end of said base assembly;
   said mounting member including a downwardly facing annular seat portion for receiving a diverter skirt assembly;
   a selectively extensible and retractable diverter skirt assembly affixed adjacent said seat of said mounting member so as to extend coaxially away from base assembly;
   said diverter skirt assembly comprising a plurality of coaxially disposed, serially adjacent ring elements and connector means connecting serially adjacent pairs of said ring elements coaxially together;
   at least some of said connecting means include fluid passage means for fluid communication between the respective interiors of the respective said ring elements such that the interiors of all of said ring elements are maintained in open fluid communication with one another;
   a fluid pressure source connection means for providing motive fluid to the interior of at least one of said ring elements; and
   at least some of said ring elements having a generally tubular cross section of a geometry that said at least some of said ring elements extend in the axial direction upon application therein of elevated pressure above ambient pressure and retract axially upon application therein of reduced pressure below ambient atmospheric pressure.

9. The apparatus as set forth in claim 8 wherein said fluid pressure source connection means communicates with the interior of the one of said ring elements disposed most closely adjacent to said mounting member.

10. The apparatus as set forth in claim 9 wherein said one of said ring elements is among said at least some of said ring elements.

11. The apparatus as set forth in claim 10 wherein all of said at least some of said ring elements include fluid chambers therein which are connected by said fluid passage means.

12. The apparatus as set forth in claim 11 wherein said at least some of said ring elements is all of said ring elements.

13. The apparatus as set forth in claim 12 wherein said ring elements are formed of resiliently deformable elastomeric material.

14. The apparatus as set forth in claim 8 wherein said base assembly includes mounting means adapted for cooperation with a drilling rig for mounting of said base assembly thereon.

15. The apparatus as set forth in claim 14 additionally including mounting elements for securing said mounting means with respect to such a drilling rig.

16. The apparatus as set forth in claim 15 wherein said mounting means is cooperable with said mounting elements to permit retention of said base assembly with respect to such a drilling rig in any selected position throughout a selected range of axial rotation of said base assembly with respect to such a drilling rig.

17. The apparatus as set forth in claim 16 wherein said selected range of axial rotation is a 360° range of axial rotation.

* * * * *